United States Patent
Yan (10) Patent No.: US 6,494,730 B1
(45) Date of Patent: Dec. 17, 2002

(54) LAMP SOCKET LOCKING INSERT IN COMBINATION WITH A MEDIUM SCREW LAMP BASE

(75) Inventor: Ellis Yan, Russell, OH (US)

(73) Assignee: Technical Consumer Products, Inc., Aurora, OH (US)

( * ) Notice: Subject to any disclaimer, the term of this patent is extended or adjusted under 35 U.S.C. 154(b) by 0 days.

(21) Appl. No.: 09/953,550

(22) Filed: Sep. 17, 2001

(51) Int. Cl.[7] ............................................. H01R 33/02
(52) U.S. Cl. ........................ 439/226; 439/558; 439/679; 439/232; 313/318.04
(58) Field of Search .................................. 439/615, 613, 439/645, 683, 133, 602, 226, 232, 236, 233, 336, 356, 679, 558; 313/318.04

(56) References Cited

U.S. PATENT DOCUMENTS

| | | |
|---|---|---|
| 3,422,393 A | 1/1969 | Plagge |
| 3,467,937 A | 9/1969 | Norton |
| 4,183,604 A | 1/1980 | Tjornhom, Sr. |
| 4,623,823 A | * 11/1986 | Engel ..................... 313/318.01 |
| 4,936,789 A | 6/1990 | Ugalde |
| 4,980,602 A | * 12/1990 | Eldridge ................. 313/318.04 |
| 5,698,935 A | * 12/1997 | Newman ................. 313/318.04 |
| 5,874,800 A | * 2/1999 | Newman ................. 313/318.04 |

* cited by examiner

Primary Examiner—Tho D. Ta
(74) Attorney, Agent, or Firm—Joseph H. Taddeo (57) ABSTRACT

An apparatus that prevents the interchange or replacement of an expensive compact fluorescent lamp with a standard inexpensive incandescent bulb to diminish thefts of the more expensive lamp, by using a locking lamp socket insert in combination with newly designed screw lamp base that permits the operation of the compact fluorescent lamp. Should the compact fluorescent lamp be substituted with a standard inexpensive incandescent bulb, the center contact in the base of the incandescent bulb cannot touch the centrally located leaf-spring contact of the lamp socket, thereby preventing the incandescent bulb from operating. The lamp socket insert is a rigid plastic material such as nylon, shaped as a flat disk with three tangential cantilever, spaced apart vanes. A pointed end of each tine permits the insert to rotate upon insertion, but a counterclockwise rotation causes the tines to bite into the interior socket sidewalls preventing its counter-rotation and removal.

19 Claims, 8 Drawing Sheets

LAMP SOCKET LOCKING INSERT IN COMBINATION WITH A MEDIUM SCREW LAMP BASE

FIELD OF INVENTION

The present invention relates primarily to a screw lamp base and locking lamp-socket device, in combination, and more particularly, to a screw lamp base, in combination with a locking lamp-socket insert that prevents the interchangement of a compact fluorescent lamp with an incandescent bulb when used in a conventional lamp socket.

BACKGROUND OF THE INVENTION

The demand for increased energy conservation has stimulated the development of compact electric discharge lamps, such a fluorescent lamps, as screw-in replacements for the standard incandescent bulb. As a result, the use of the compact fluorescent lamp has resulted in a substantial savings at a reduced operating and maintenance cost.

While it is quite cost effective to replace an incandescent bulb with a compact fluorescent lamp, the converse, such as replacing a compact fluorescent lamp with an incandescent bulb, is no longer desirable.

Recreational industries, such as hotels and motels, using these compact fluorescent lamps are subject to pilfering where the expensive compact fluorescent lamp is taken as a souvenir and replaced with an inexpensive incandescent bulb. This exchange is not usually detected in a reasonably short period of time, which may result in an additional operating loss to the facility.

U.S. Pat. No. 4,936,789, granted Jun. 26, 1990, to J. Ugalde, discloses a method and apparatus for preventing the theft of a fluorescent lamp and ballast transformer. The apparatus comprises a threaded adaptor that is screwed into a conventional lamp socket. The receptacle at the top of the adaptor has spring clips that retain the fluorescent lamp to prevent its removal, once engaged. The table lamp, in which the adaptor is installed, is connected via a male polarized plug, to a remote power supply. The power supply is plugged into a standard wall outlet using a tamper proof fastener, preventing its removal. Spring clips within the power supply prevent the removal of the inserted male plug.

U.S. Pat. No. 4,183,604, granted Jan. 15, 1980, to D. A. Tjornhom, Sr., discloses an apparatus for mounting and removing an electrical adapter from a socket. The adapter threads into a standard lamp socket, where a locking tab on the base of the adapter, permits the adapter to be threaded into the socket, but jams the threads of the socket to prevent its removal. A removal tool is used to release the lock structure to permit removal of the adapter.

U.S. Pat. No. 3,467,937, granted Sep. 16, 1969, to O. C. Norton, discloses a lamp socket insert, which serially connects a thermistor disk in the power line circuit to an incandescent lamp bulb to absorb current surges when the lamp is turned on. The peripheral rim, by interference fit, retains the device from falling out of an inverted socket when the lamp is removed.

U.S. Pat. No. 3,422,393, granted Jan. 14, 1969, to V. L. Plagge, discloses a an electric lamp base and socket adapter combination for rapid and simple lamp replacement. The socket adapter screws into a standard socket, and incorporates a female snap fastener and spring conductors for both electrical connection and mechanical support. The male portion of the snap fastener is affixed to the lamp base and is guided into connecting position by the spring conductors.

What is needed is an apparatus that prevents the interchangement of an expensive compact fluorescent lamp with a standard incandescent bulb to prevent the theft of the more expensive lamp. In this regard, the present invention fulfills this need.

SUMMARY OF INVENTION

The present invention relates to an apparatus that prevents the interchangement or replacement of an expensive compact fluorescent lamp with a standard inexpensive incandescent bulb to deter or prevent the theft of the more expensive lamp. It is comprised of an elongated medium screw lamp base and a locking lamp-socket device, where the combination of the screw lamp base and locking lamp-socket insert permits the operation of the compact fluorescent lamp having the base of the present invention. If, however, the compact fluorescent lamp is substituted with a standard inexpensive incandescent bulb, the bulb will not operate, thereby preventing the interchangement of a compact fluorescent lamp with a standard inexpensive incandescent bulb.

Projecting from the bottom of a compact fluorescent bulb or from the bottom of a conventional electronic ballast housing is the newly designed elongated screw lamp base. The threaded metal screw portion of the base extends axially approximately one-half inch below the bottom of the ballast housing. This extended portion permits the ballast housing assembly to engage in a standard lamp-socket, without bottoming out against the inner surface of a reflector or lamp harp, should one be used.

The center contact of the newly designed screw lamp base extends through an insulated boss that is preferably $7/32$ of an inch in diameter and $5/32$ of an inch long, for a medium lamp screw base lamp.

The lamp-socket insert is made from a rigid plastic material, preferably nylon. It is made in the shape of a flat disk, having three tangential cantilever spring-like tines, equally spaced 120 degrees apart. At the end of each tine is a sharpened end that is shaped to permit the insert to freely rotate upon insertion. If there is an attempt to remove the insert by rotating it in a counterclockwise direction, the spring-loaded tangential tines become further engaged with, and bite into, the interior socket sidewall, so that its counter-rotation and subsequent removal is prevented.

When a fluorescent lamp, having an integral electronic ballast—one that uses the newly designed lamp screw base—is screwed into its protected lamp-socket, a hole in the center of the insert receives the extended center contact of the lamp, permitting it to make contact with the centrally located leaf-spring contact of the lamp-socket.

Should an attempt be made to substitute the fluorescent lamp, having the newly designed base, with a conventional incandescent bulb, the center contact in the base of the bulb cannot come in contact with the centrally located leaf-spring contact of the lamp-socket, thereby preventing the bulb from operating. When a lamp or fixture fails to provide illumination, it either draws attention to the fact that the fluorescent lamp has failed or that someone has made off with it.

Accordingly, it is therefore an object of the present invention to provide a novel elongated lamp screw base and lamp-socket insert combination that prevents the interchangement, substitution or replacement of a protected lamp, with a less expensive bulb.

It is another object of the present invention to provide a novel lamp screw base and lamp-socket insert combination to prevent the theft of a compact fluorescent lamp or fluorescent lamp ballast.

It is still another object of the present invention to provide a novel lamp screw base whose center contact extends through an insulated boss, where the diameter of the boss is sized to be received through a hole located centrally in the companion lamp-socket insert.

It is still yet another object of the present invention to provide a novel lamp screw base whose center contact is sufficiently extended axially to come in contact with the centrally located leaf-spring contact of the lamp-socket.

It is a further object of the present invention to provide a novel lamp screw base, whose threaded metal screw portion extends axially approximately one-half inch below the bottom of a ballast housing to prevent the housing from bottoming out against the inner surface of a reflector, when used.

It is still a further object of the present invention to provide a novel lamp-socket insert that coacts with the lamp screw base to prevent the interchangement, substitution or replacement of a protected lamp, with a less expensive bulb.

It is still yet a further object of the present invention to provide a novel lamp-socket insert having three tangential cantilever springlike vanes or tines, equally spaced 120 degrees apart, that are shaped to permit easy insertion upon clockwise rotation.

An additional object of the present invention is to provide a novel lamp socket insert, having spring-loaded tangential vanes or tines that become further engaged with, and bite into, the interior socket sidewall, so that a counterclockwise rotation prevents its removal.

A final object of the present invention is to provide a novel elongated lamp screw base and lamp-socket combination that prevents a standard incandescent lamp from being energized.

These and other objects of the present invention will become apparent upon further review and understanding of the detailed specification and drawings that follow.

BRIEF DESCRIPTION OF THE DRAWINGS

A better appreciation of the present invention can be had by referring to the following drawings, wherein.

DETAILED DESCRIPTION OF THE PRESENT INVENTION

The present invention relates primarily to a combination base and lamp-socket insert assembly that when used, prevents the interchangement of an expensive compact fluorescent bulb with an inexpensive incandescent bulb.

For example, when the lamp is used in a hotel or motel setting, should the compact lamp be removed from the premises of its intended use, the conspicuous absence of the lamp is easily detected when the power switch is turned on. Further, should the compact lamp be removed from the premises and replaced with an incandescent bulb, the substitution may not be as easily detected. However, when the novel insert is used in a conventional lamp-socket, replacement with a standard incandescent bulb will not allow the bulb to function.

In the case of the theft of a fluorescent lamp, there is not only the loss of a compact lamp, but if the substitution of an incandescent bulb remains undetected, there is an increased operating cost because of the increased amount of electricity used.

Figure 1:
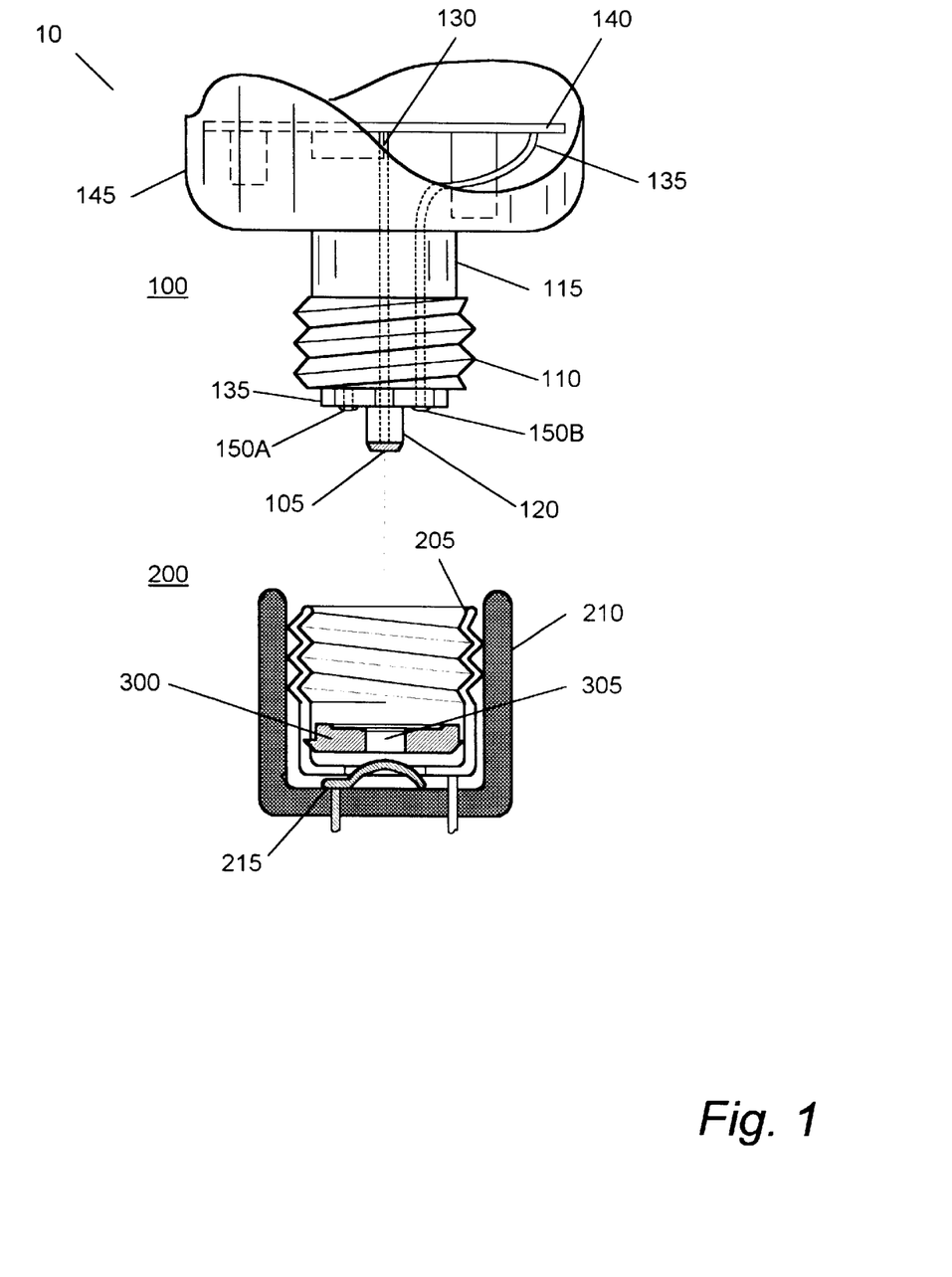
FIG. 1 is a side sectional view of the combination lamp screw base and locking lamp-socket insert which best illustrates the present invention.

FIG. 1 best illustrates base and insert combination 10 of the elongated lamp screw base 100 and lamp-socket insert 200.

The lamp screw base unit 100 comprises a nonconductive elongated cylindrical shell 115 that projects from the bottom of a compact fluorescent bulb, having an integrated electronic ballast housing 145. The electrically conductive base male threaded cylindrical shell member 110 is axially extended approximately one-half inch below the bottom of the ballast housing 145. This extended portion 115 permits the ballast housing assembly to engage in a standard lamp-socket 210, without bottoming out against the inner surface of a reflector or lamp harp (not shown), should one be used.

When the lamp screw base unit 100 is axially screwed into the socket. the protruding portion of the boss 115 projects through the hole 305 in the center of the insert 300, where the electrically conductive base center contact 105 communicates with electrically conductive leaf spring center contact 215 to power the lamp.

With the newly designed insert 300 installed into a conventional lamp socket 200, the center contact of a standard incandescent bulb (not shown) cannot protrude through the hole 305 to make contact with the center contact 215, thereby preventing the bulb from illuminating.

The center contact 105 is connected to the electronic ballast circuit board 140 via connecting wire 130. Rivet 150A joins the cylindrical shell member 110 with the base member 120 to support the assembly and rivet 150B not only supports the assembly but electrically bonds the shell member 110 with the electronic ballast circuit board 140 via connecting wire 135, thereby completing the circuit.

Figure 2:
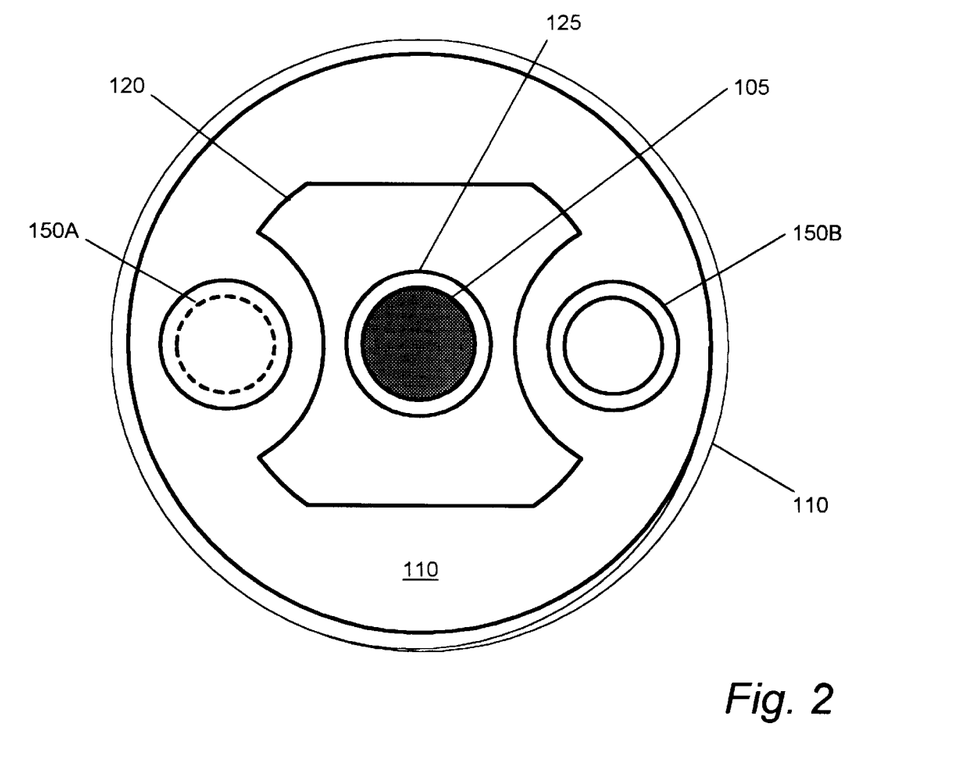
FIG. 2 is a bottom elevational view of the lamp screw base that shows the contact arrangement of the present invention.
Figure 3:
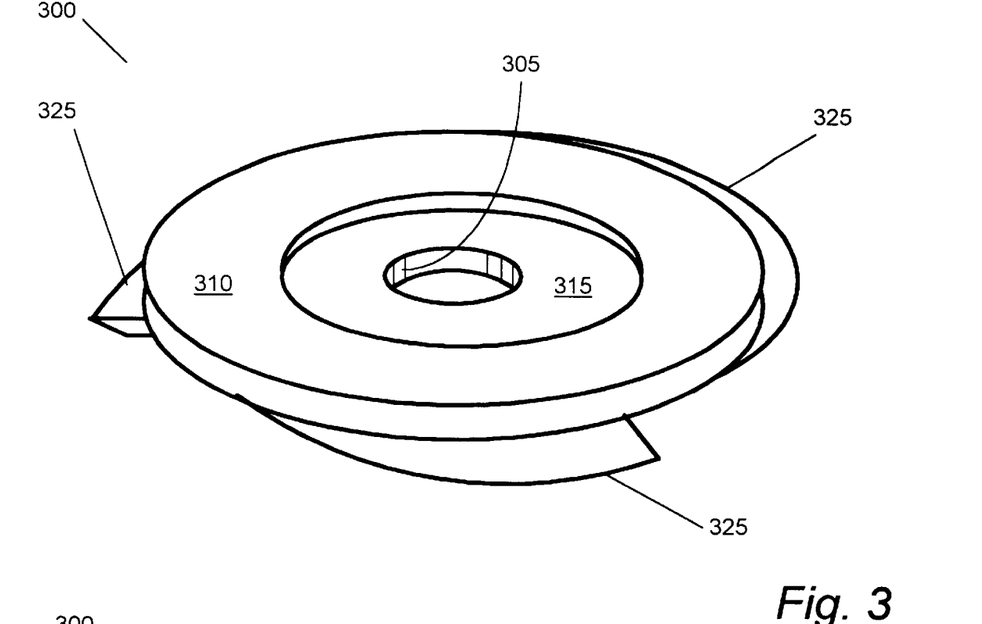
FIG. 3 is a perspective view of the locking lamp-socket insert of the present invention that prevents the interchangement of a compact fluorescent lamp with a standard incandescent bulb.
Figure 4:
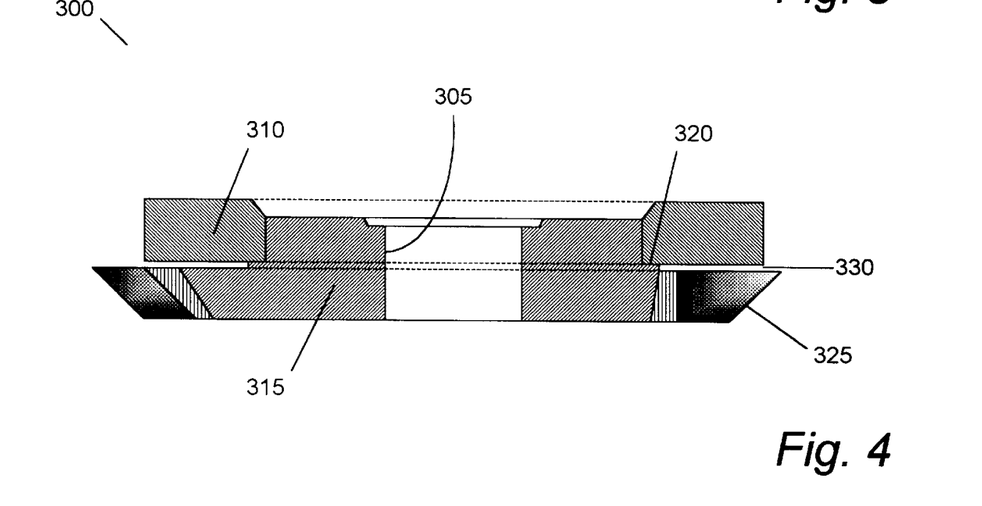
FIG. 4 is a side sectional view of the locking lamp-socket insert of the present invention.
Figure 5:
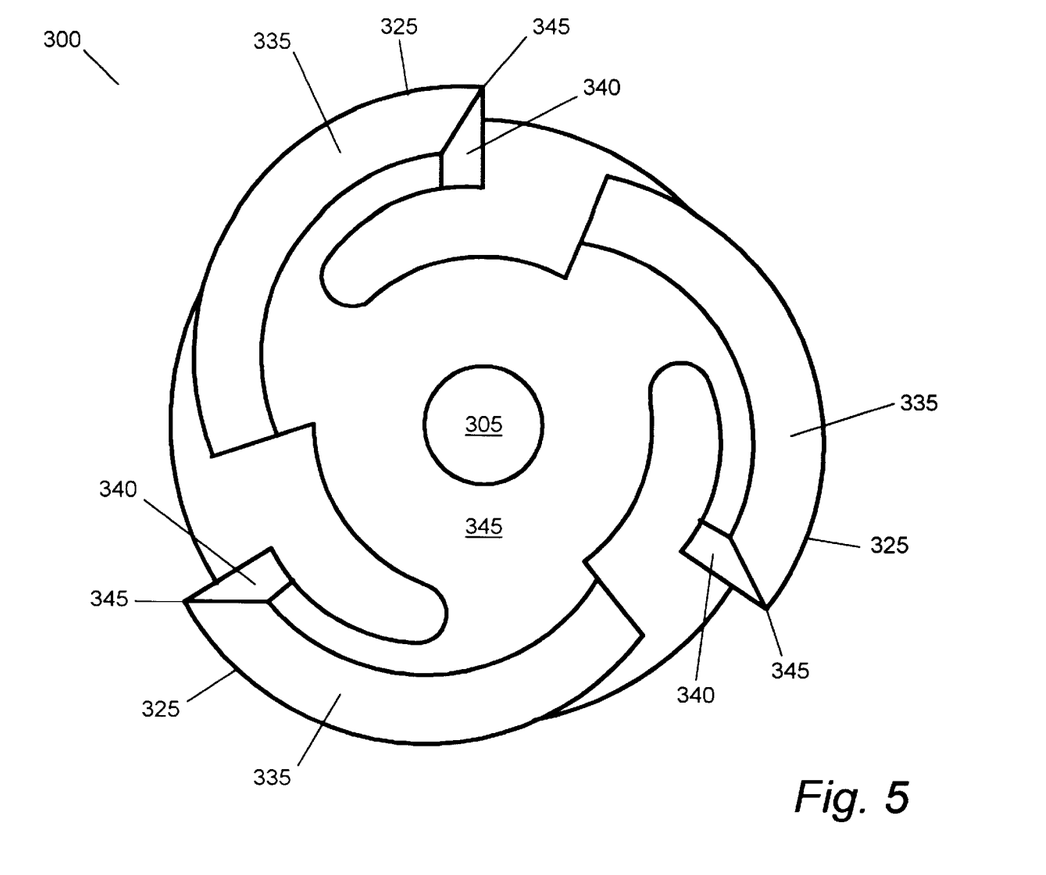
FIG. 5 is a bottom elevational view of the locking lamp-socket insert of the present invention, which shows the three cantilever locking vanes.
Figure 6:
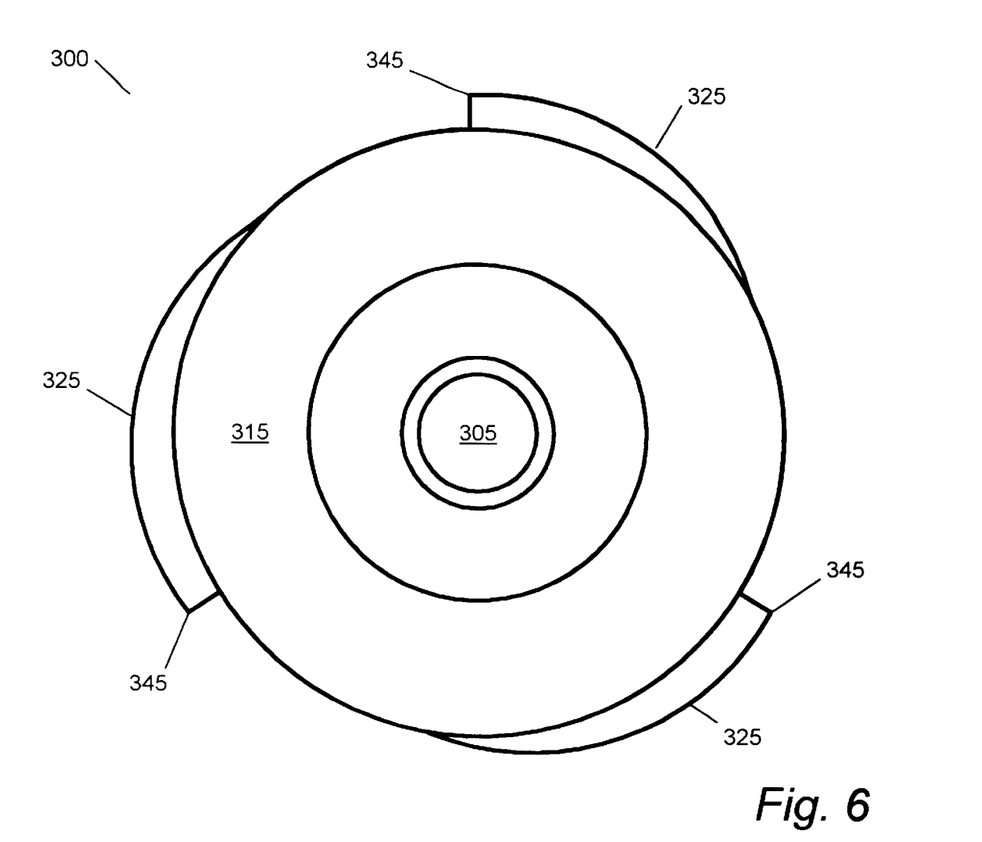
FIG. 6 is a top elevational view of the locking lamp-socket insert of the present invention.

FIG. 2 is a bottom view of the lamp screw base which best shows the contact arrangement of the present invention, where the base insulator 120 and the center contact boss 125 comprise a one-piece nonconductive support for the center contact 105. Two oppositely disposed rivets 150A and 150B unite the base insulator 120 together with the cylindrical shell member 110, where the rivet 150B provides electrical conductivity to the electronic ballast circuitry 140, as shown previously in FIG. 1.

Turning now to FIGS. 3, 4, 5 and 6, there is shown in detail the lamp-socket disk insert 300 of the preferred embodiment of the present invention. The disk insert 300 is comprised of 2 pieces, a circular ring 310 and a tri-vaned center member 315. The material selected for the disk insert is preferably a nylon injection-molded plastic or any other suitable nonconductive insulating material. The tri-vaned center member 315 is inserted into the circular ring 310, where both are either cemented or electronically bonded together. The circular step 320 maintains a clearance distance 330 between the tangential cantilever vanes 325 and the circular ring 310, preferably 0.080 inches, to prevent the vanes from binding when radially compressed. circular ring 310, preferably 0.080 inches, to prevent the vanes from binding when radially compressed.

The lamp-socket insert 300 is made in the shape of a flat disk, having three tangential cantilever springlike tines or vanes, equally spaced 120 degrees apart. Each vane 325 comprises a cantilever arm that acts in a springlike manner when radially compressed inward. Each vane 325 has an arcuate beveled edge 335 that follows the curvature of the arc forming the cantilever spring arm 325. At the distal end of each arm is another beveled edge 340 angled at approximately 75 degrees. The junction of the arcuate beveled edge 335 and the distal beveled edge 340 forms an anti-reversal penetrating point 345 that prevents the counterclockwise rotation and subsequent removal of the insert, once it has been installed into a lamp-socket 200. Counterclockwise rotation of the insert 300 is prevented by the three cantilever spring arms 325 being compressed radially inward toward the center, causing each of the points 345 to jam by penetrating into the sidewalls of the lamp-socket shell member 205.

Figure 7:
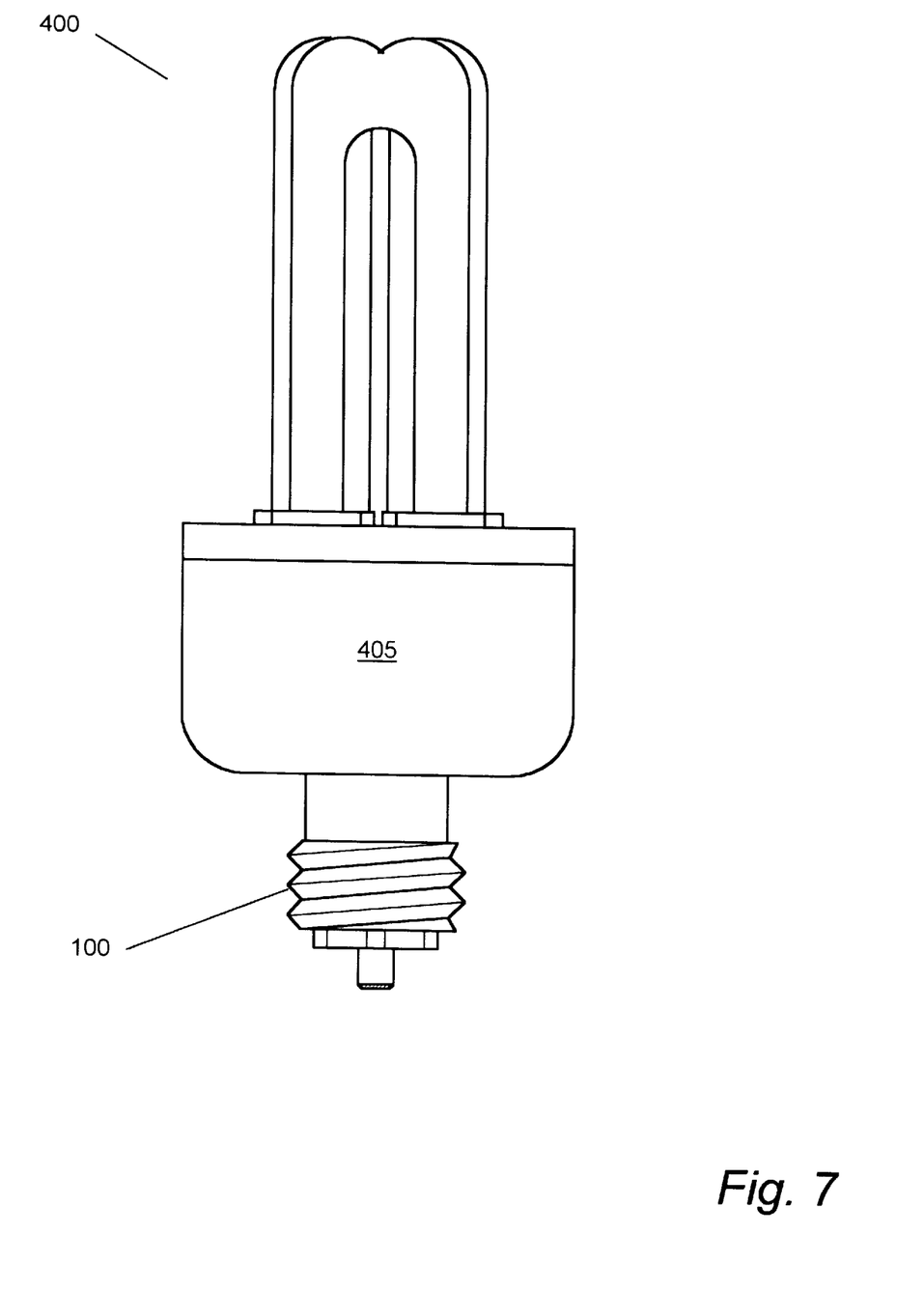
FIG. 7 is a side elevational view of a typical compact triple biaxial fluorescent lamp having the novel lamp screw base molded integral with the lamp base housing.

An application using the newly designed lamp base and insert combination is shown in FIG. 7. The novel screw lamp base 100 is molded integral with the ballast-housing unit 405 of a compact fluorescent spring lamp 400.

Figure 8:
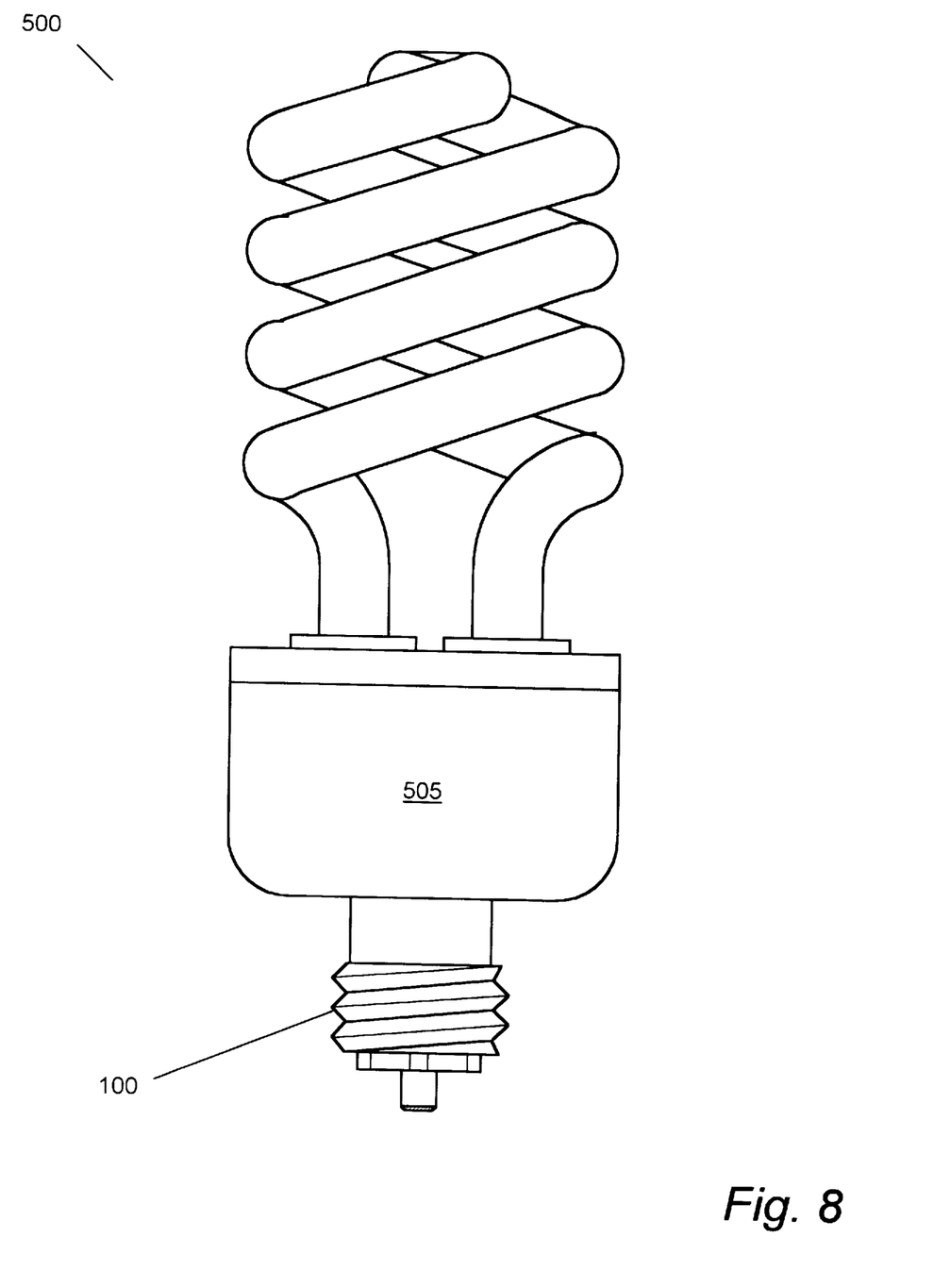
FIG. 8 is a side elevational view of a typical compact fluorescent spring lamp having the novel lamp screw base molded integral with the lamp base housing.

Shown in FIG. 8 is another application using the novel lamp base and insert combination. The novel screw lamp base 100 is molded integral with the ballast-housing unit 505 of a typical compact triple biaxial fluorescent lamp 500.

Figure 9:
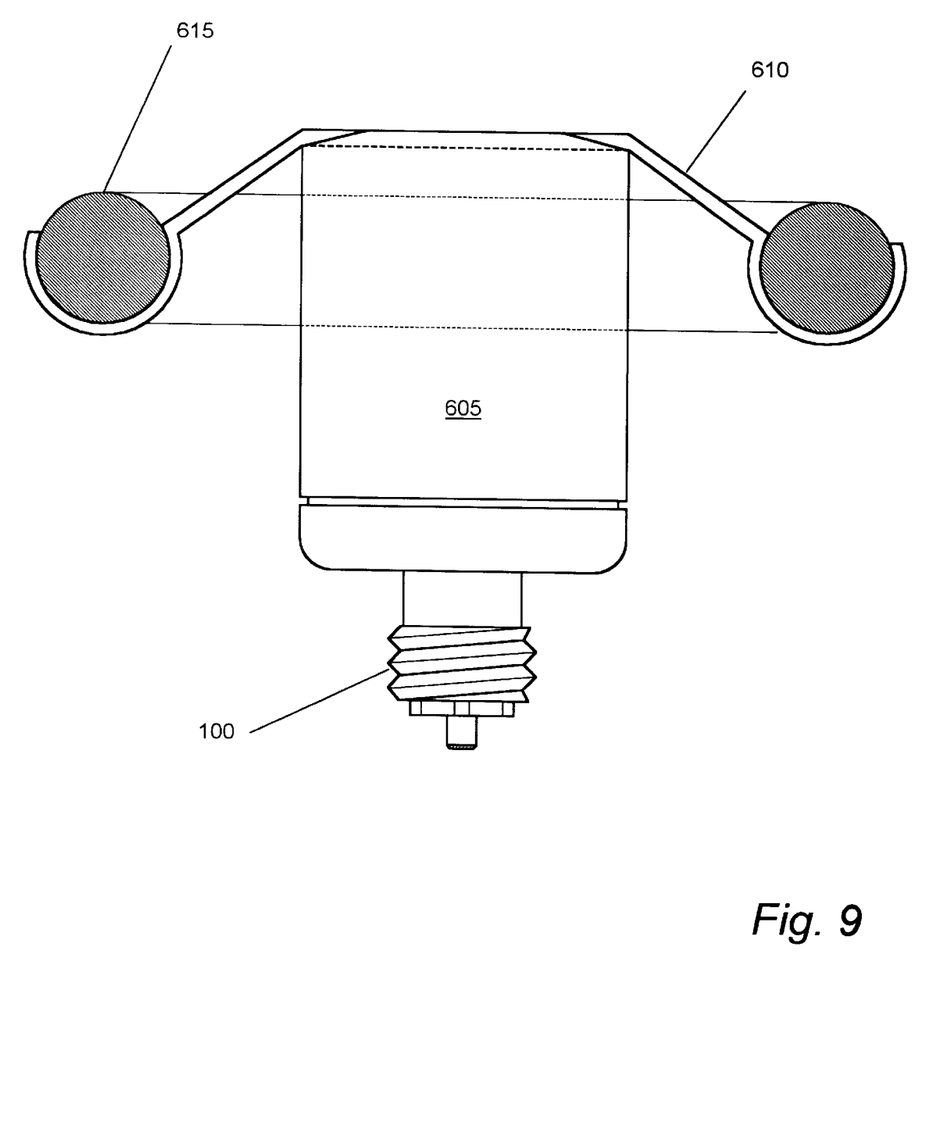
FIG. 9 is a side elevational view of the screw lamp base as an integral portion of an electronic ballast, upon which is mounted, a circular fluorescent lamp.

FIG. 9 shows a side elevational view of the screw lamp base 100 that is an integral portion of an electronic ballast 605, upon which is mounted, a circular fluorescent lamp bracket 610. The circular fluorescent lamp 615, in turn is supported by bracket 610.

It should be understood that even though the present invention is described in detail for its particular embodiment, there may be other variations and modifications that will become apparent to those who are skilled in the art, and that these modifications or variations that can be made should not detract from the true spirit of this invention.

The invention claimed is:

1. An apparatus to reduce theft by preventing the replacement of an energy saving bulb with a standard incandescent bulb, comprising:
    a mechanically locking lamp socket insert having a flat disc shape with a center hole, said mechanically locking lamp socket is installed in a standard lamp socket to allow a center contact of an energy saving bulb to communicate electrically and permit the operation of the energy saving bulb; and
    a mechanical means for preventing removal of said mechanically locking lamp socket insert.

2. The apparatus in accordance with claim 1, further comprising a means for preventing electrical contact of a standard incandescent bulb, whereby operation of a standard incandescent bulb is impossible while said locking lamp socket insert is installed in the lamp socket.

3. The apparatus in accordance with claim 2, wherein said locking lamp socket insert includes three compressible, spaced apart cantilever spring tines, an end of each tine including a pointed projection directed counterclockwise, whereby said mechanically locking lamp socket insert freely rotates in a clockwise direction for insertion into a standard lamp socket, but upon a counterclockwise rotation, said cantilever spring tines further engage with, and burrow into, the lamp socket to prevent removal of said locking lamp socket insert from the lamp socket.

4. The apparatus in accordance with claim 3, wherein the locking lamp socket insert is fabricated from a nonconductive insulating material.

5. The apparatus in accordance with claim 4, wherein the energy saving bulb is a compact fluorescent lamp.

6. The apparatus in accordance with claim 5, wherein the compact fluorescent lamp communicates through an elongated lamp screw base having an elongated cylindrical shell with a threaded screw portion extending axially downward from the compact fluorescent lamp, said threaded screw portion surrounding a base member having a protruding insulated boss with a center of contact that extends through the center of said locking lamp socket insert allowing said center of contact to communicate electrically for operation of the compact fluorescent lamp.

7. The apparatus in accordance with claim 6, wherein said elongated cylindrical shell of said elongated lamp screw base is fabricated from a nonconductive material.

8. The apparatus in accordance with claim 7, wherein said threaded screw portion of said elongated medium lamp screw base is fabricated from an electrically conductive material.

9. The apparatus in accordance with claim 8, wherein the compact fluorescent lamp includes an integrated ballast housing, wherein said elongated lamp screw base permits the ballast housing of the compact fluorescent lamp to engage in a standard lamp socket without bottoming out against a lamp reflector or harp.

10. The apparatus in accordance with claim 9, wherein said mechanically locking lamp socket insert positioned between a center of contact of a standard incandescent bulb and a conductive leaf spring center contact of a standard lamp socket provides an insulator preventing power to a standard incandescent bulb.

11. The apparatus in accordance with claim 10, further comprising an electronic ballast circuit board in communication with said center of contact.

12. The apparatus in accordance with claim 11, further comprising a first rivet which connects said threaded screw portion with said base member and a second rivet which electrically connects said threaded screw portion with said electronic ballast circuit board.

13. The apparatus in accordance with claim 12, wherein said mechanically locking socket insert is fabricated from two pieces, a circular ring and a tri-vaned center member, and, wherein said tri-vaned. center member is positioned within the circular ring.

14. The apparatus in accordance with claim 13, wherein said circular ring and said tri-vaned center member are joined.

15. The apparatus in accordance with claim 14, wherein a circular step maintains a clearance distance between said circular ring and said tri-vaned center member.

16. The apparatus in accordance with claim 15, wherein said cantilever spring tines have an arcuate beveled edge following the curvature of the arc forming said cantilever spring tines, a beveled end of said cantilever spring tine culminating in the pointed counterclockwise projection.

17. The apparatus in accordance with claim 16, wherein said insulated boss has a sufficient length to pass through the mechanically locking lamp socket insert for insulation of the compact fluorescent lamp center contact to its connection with said conductive leaf spring center contact of the lamp socket.

18. A method for reducing theft of compact fluorescent lamps by preventing replacement of a compact fluorescent lamp with a standard incandescent bulb, comprising the steps of:

(a) installing a mechanically locking lamp socket insert into a conventional lamp socket;

(b) mechanically locking said mechanically locking lamp socket insert to prevent its removal from the lamp socket; and (c) insulating center contact of the lamp socket from a center of contact of an incandescent bulb to prevent lighting an incandescent bulb inserted in the lamp socket.

19. An apparatus to impair removal of a compact fluorescent lamp and its replacement with a standard incandescent bulb, said apparatus comprising an elongated medium screw lamp base and a mechanically locking lamp socket device, where the combination of said elongated medium screw lamp base and said mechanically locking lamp socket device permits the operation of the compact fluorescent lamp;

(a) said elongated medium screw lamp base having an elongated cylindrical shell fabricated from a nonconductive material and said threaded screw portion comprising an electrically conductive material which extends axially below a bottom of the compact fluorescent lamp, said threaded screw portion is connected to the base member by a first rivet, said base member having a protruding insulated boss surrounding a center of contact that extends through a center of said mechanically locking lamp socket device to a leaf spring center contact in a standard lamp socket, said center of contact being connected to an electronic ballast circuit board, and a second rivet of the base member for connecting said electronic ballast circuit board with said threaded screw portion; and (b) said mechanically locking lamp socket device having a flat disk shape, and being fabricated from a nonconductive insulating material, and including two pieces, a circular ring and a tri-vaned center member, said tri-vaned center member having three cantilever spring tines which have an arcuate beveled edge following the curvature of the arc forming said cantilever spring tines, and at the distal end is a beveled edge angle, wherein said cantilever spring tines are spaced apart, said tri-vane center member is joined with the circular ring, and a circular step including a clearance distance between the tri-vaned center member and said circular ring, whereby said mechanically locking lamp socket device prevents a center of contact of a standard incandescent bulb from electrically communicating with the conductive leaf spring center contact and prevents lighting of the standard incandescent bulb.

* * * * *